United States Patent [19]

Matsuura

[11] Patent Number: 5,199,149
[45] Date of Patent: Apr. 6, 1993

[54] METHOD OF JOINING TWO SUPERIMPOSED FLAT THIN OBJECTS TOGETHER USING A FRANGIBLE JOINING PIN

[75] Inventor: Hideo Matsuura, Komaki, Japan

[73] Assignee: Kunimori Kagaku Co., Ltd., Aichi, Japan

[21] Appl. No.: 883,472

[22] Filed: May 15, 1992

[30] Foreign Application Priority Data

Nov. 26, 1991 [JP] Japan ................... 3-336119

[51] Int. Cl.$^5$ .................................... B23P 11/00
[52] U.S. Cl. .................... 29/432.2; 29/432; 411/42; 411/510; 403/2
[58] Field of Search ............. 29/418, 432, 432.2, 29/525.1, 453; 411/29, 30, 31, 338, 339, 508, 509, 510, 456, 42; 403/2, 408.1, 388

[56] References Cited

U.S. PATENT DOCUMENTS

| | | | |
|---|---|---|---|
| 2,126,161 | 8/1938 | Woodward | 29/432.2 |
| 2,133,916 | 10/1938 | Churchill | 29/453 |
| 3,238,835 | 3/1966 | Rosenberg | 411/338 |
| 3,487,745 | 1/1970 | Brunelle | 29/432 |
| 3,523,395 | 8/1970 | Rutter et al. | 29/525.1 |

FOREIGN PATENT DOCUMENTS 565543 7/1960 Belgium ................... 411/456

Primary Examiner—P. W. Echols
Assistant Examiner—David P. Bryant
Attorney, Agent, or Firm—Frishauf, Holtz, Goodman & Woodward

[57] ABSTRACT

A washer is positioned beneath a superimposed assembly of two or more flat thin objects (e.g. resin sheets) which is horizontally supported. A hollow joining pin is fitted about a metal pin supported vertically and coaxially with the washer. The joining pin has a head, a shank and a tapered end portion which is severable from the shank. The metal pin has a pointed end about which the tapered end portion of the joining pin is positioned. The metal pin is vertically movable with the joining pin, or independently of it. The metal pin and the joining pin are moved down to drive its pointed end and its tapered end portion, respectively, into the assembly to make a hole therein and force the shank through the hole until the shank is engaged with the washer, whereby the objects are secured together between the head of the joining pin and the washer. The metal pin is moved down through the joining pin to sever its tapered end portion from its shank. The objects, washer, and joining pin are all of the same material.

8 Claims, 7 Drawing Sheets

METHOD OF JOINING TWO SUPERIMPOSED FLAT THIN OBJECTS TOGETHER USING A FRANGIBLE JOINING PIN

BACKGROUND OF THE INVENTION

1. Field of the Invention:

This invention relates to a method of joining two superimposed flat thin objects together, for example, two corrugated sheets of a resin.

2. Description of the Prior Art:

A known method of joining, for example, two superimposed sheets of a resin together employs metal staples which are driven through the sheets, and clinched at the protruding ends thereof. The use of the metal staples for joining the resin sheets, however, makes difficult or impossible the reuse of the resin sheets in a recyclable manner which calls for the removal of the staples. The metal staples are harder than the resin sheets, and therefore, likely to damage any other resin sheet that may contact the staples. Moreover, the metal staples are likely to get rusty with the passage of time.

Another known method is intended for joining together two superimposed sheets of a resin each having holes which are alignable with the holes of the other sheet. A pin of the same resin as the resin of the sheets is passed through each pair of aligned holes, and deformed by melting at its protruding end to secure the sheets together. This method is beneficial from a recycling standpoint, insofar as both the sheets and the pins are of the same kind of a resin. The necessity of making the holes for the pins is, however, a disadvantage from a productivity standpoint.

SUMMARY OF THE INVENTION

Under these circumstances, it is an object of this invention to provide a method for joining two superimposed flat thin objects firmly together without having to make any hole through the objects in advance.

It is another object of this invention to provide a method for joining two superimposed flat thin objects together in a way that facilitates recycling of the objects.

These objects are attained by a method which joins two or more flat thin objects together by employing a joining pin (or pins) made of the same kind of material with the objects and a metal pin assisting the joining pin when joining the objects, which are both characteristic in construction as will hereunder be described. The joining pin has a shank having a diametrically enlarged head at one end thereof, a radially outwardly projecting shoulder at the other end thereof and an axial bore, and a protruding end portion having a tapered outer peripheral surface and an axial bore which is smaller in diameter than the axial bore of the shank, the end portion being severable from the shank. The metal pin has a pointed end having an outer peripheral surface tapered substantially at the same angle as the tapered surface of the joining pin. The joining pin is fitted about the metal pin supported in the axial bore of a pusher shaft axially movably, while a washer having an engaging portion which is engageable with the shoulder of the shank is held against the bottom of the superimposed and horizontally positioned objects to be joined, so that the washer may be coaxial with the joining pin. The pusher shaft is moved down toward the objects to drive the pointed end of the metal pin and the protruding end portion of the joining pin into the objects to form a hole therethrough and force the shank through the hole until its shoulder is engaged with the engaging portion of the washer. Then, the metal pin is moved down through the pusher shaft, so that the protruding end portion of the joining pin may be severed from its shank.

Other features and advantages of this invention will become apparent from the following description and the accompanying drawings.

DETAILED DESCRIPTION OF THE INVENTION

Figure 1:
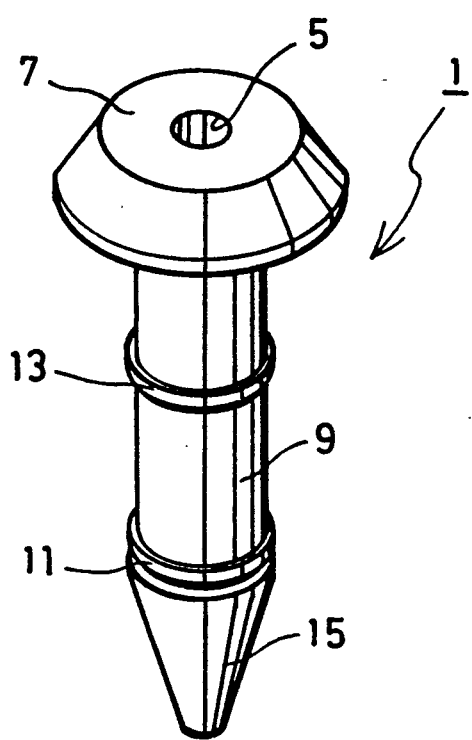
FIG. 1 is a perspective view of a joining pin made of a resin which is used for carrying out a method embodying this invention.
Figure 2:
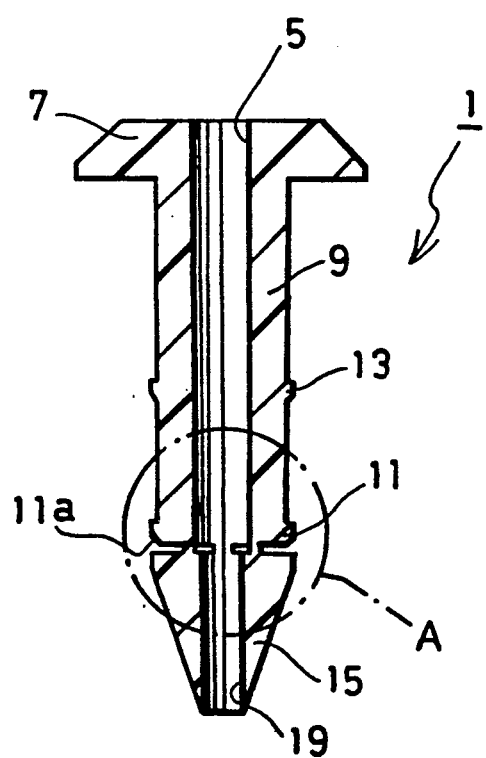
FIG. 2 is a longitudinal sectional view of the pin shown in FIG. 1.
Figure 3:
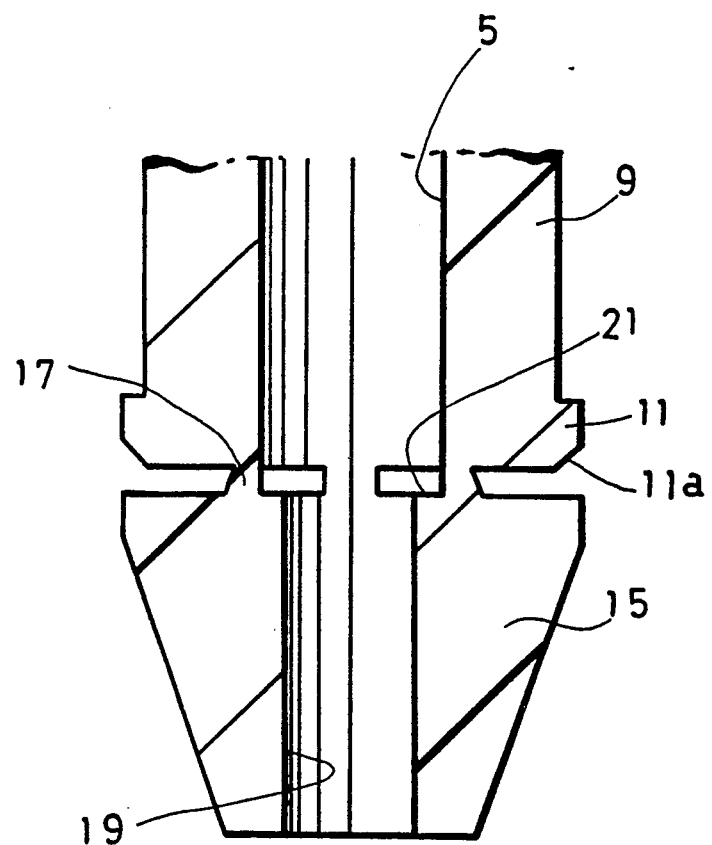
FIG. 3 is an enlarged view of part A of FIG. 2.
Figure 4:
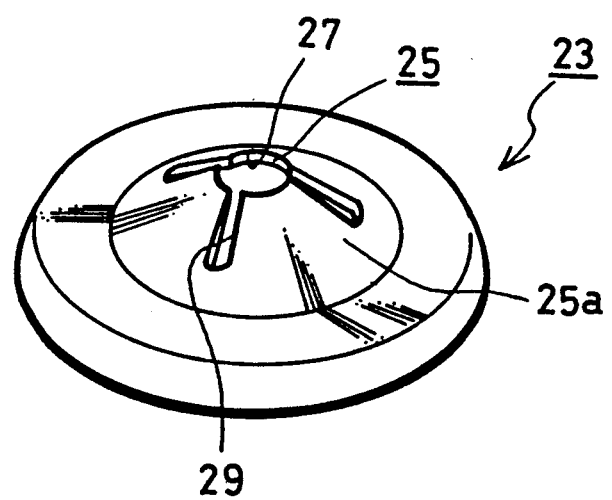
FIG. 4 is a perspective view of a washer.

A method embodying this invention will now be described with reference to the drawings. It is a method employed for joining two corrugated sheets of a resin together. Description will first be made of a joining pin and a washer which are used for joining the resin sheets together, and which are shown in FIGS. 1 to 4. Although it may be usual to employ a plurality of pins and washers, the drawings and the following description show and refer to only one joining pin and one washer.

The joining pin 1 is made of the same kind of synthetic resin as the corrugated sheets 3 and 4 to be joined (FIG. 6 and 7), and has a shank 9 and a protruding tapered end portion 15. The shank 9 has a length which is larger than the total thickness of the superimposed resin sheets 3 and 4. The shank 9 has a radially projecting diametrically enlarged head 7, and a cylindrical axial bore 5. The shank 9 has a radially outwardly projecting shoulder 11 at its end remote from the head 7 and the shoulder 11 has a tapered outer peripheral surface 11a increasing its diameter toward the head 7. The shank 9 also has at least one radially outwardly projecting intermediate shoulder 13 between the head 7 and the shoulder 11.

The protruding tapered end portion 15 is connected to the lower end of the shank 9 by four circumferentially equally spaced apart links 17 forming integral parts of the shank 9 and the tapered end portion 15. The tapered end portion 15 is severable from the shank 9 when the links 17 are cut, as will hereinafter be described. The tapered end portion 15 has a cylindrical axial bore 19 connected coaxially with the axial bore 5 of the shank 9 and having a diameter which is slightly smaller than that of the latter. This difference in bore diameter defines a shoulder 21 on the tapered end portion 15 at its end close to the shank 9. The shoulder 21 is engageable with a shoulder 41b on a metal pin 41 which will hereinafter be described.

The washer 23 is a disk made of the same kind of synthetic resin as the pin 1, and has an outer diameter which is substantially equal to that of the head 7 of the shank 9. The washer 23 has in its center a bulging portion 25 having in its center a hole 27 having a diameter which is substantially equal to the outer diameter of the shank 9. The bulging portion 25 has three circumferentially equally spaced apart radially extending slots 29 terminating in the hole 27. The slots 29 define three engaging portions 25a which are engageable with the shoulder 11 of the shank 9.

Figure 5:
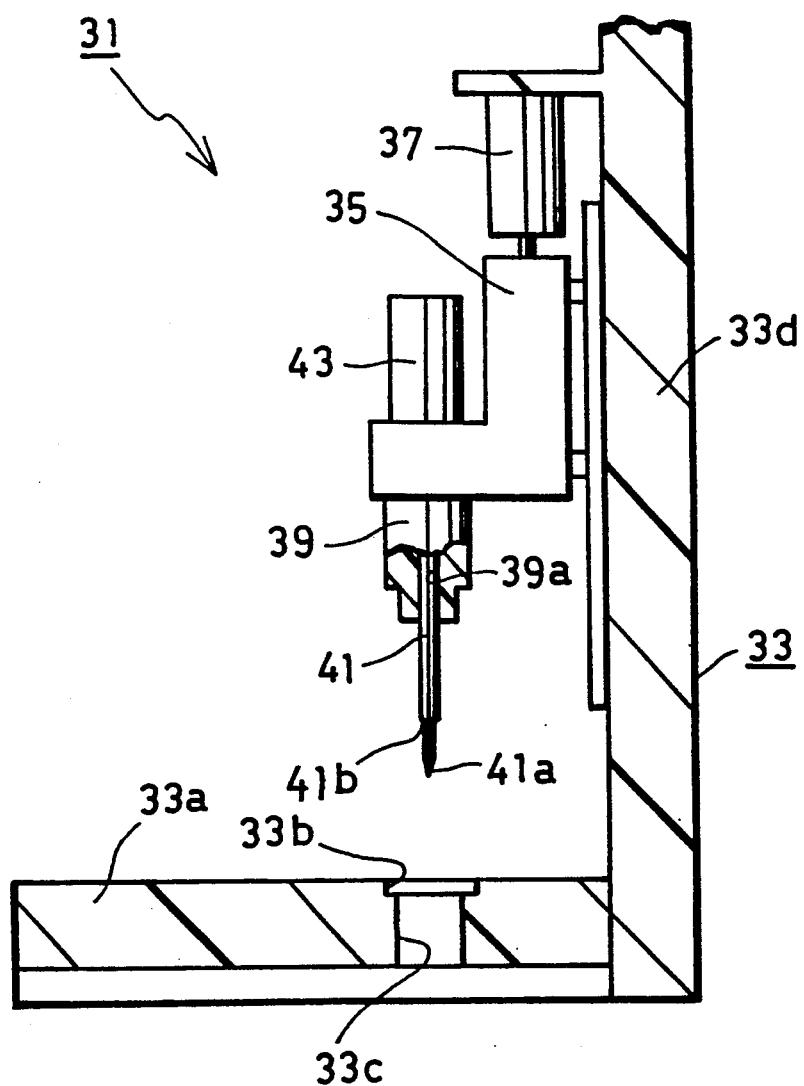
FIG. 5 is an elevational view, partly in section, of an apparatus which is used for carrying out the method embodying this invention.
Figure 6:
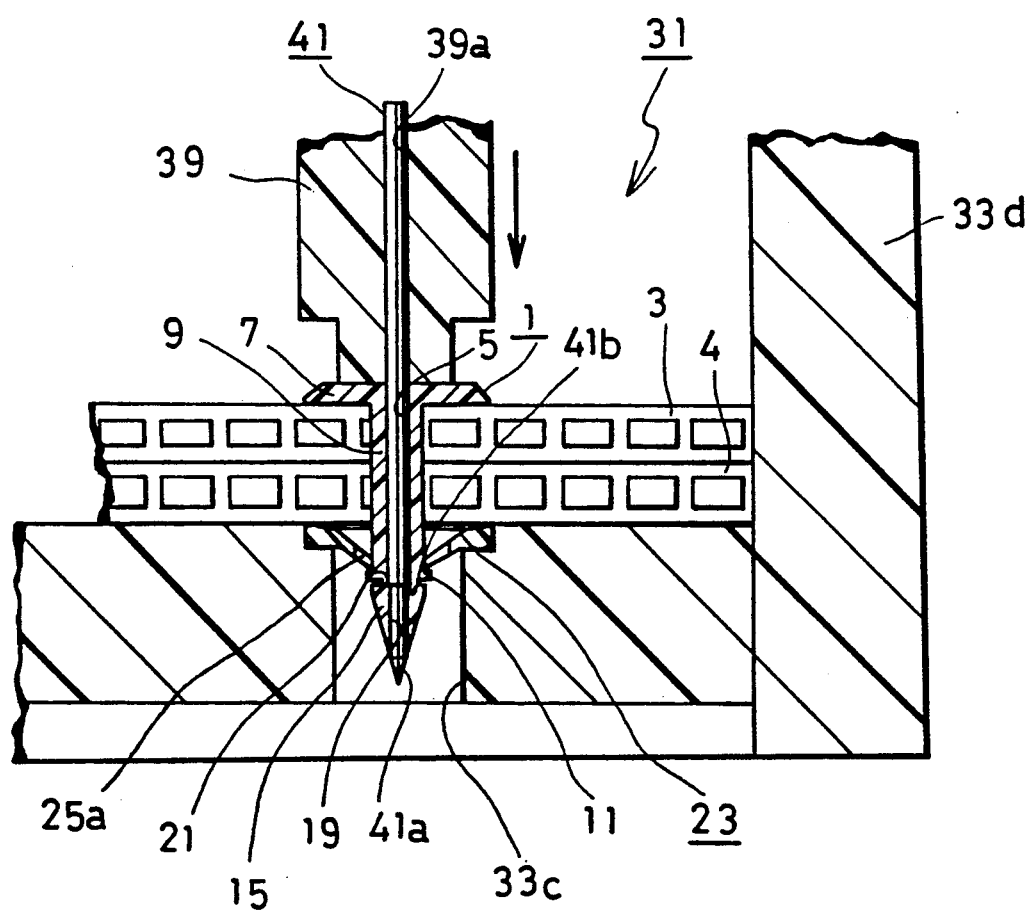
FIG. 6 is a vertical sectional view showing two sheets joined together by a joining pin.
Figure 7:
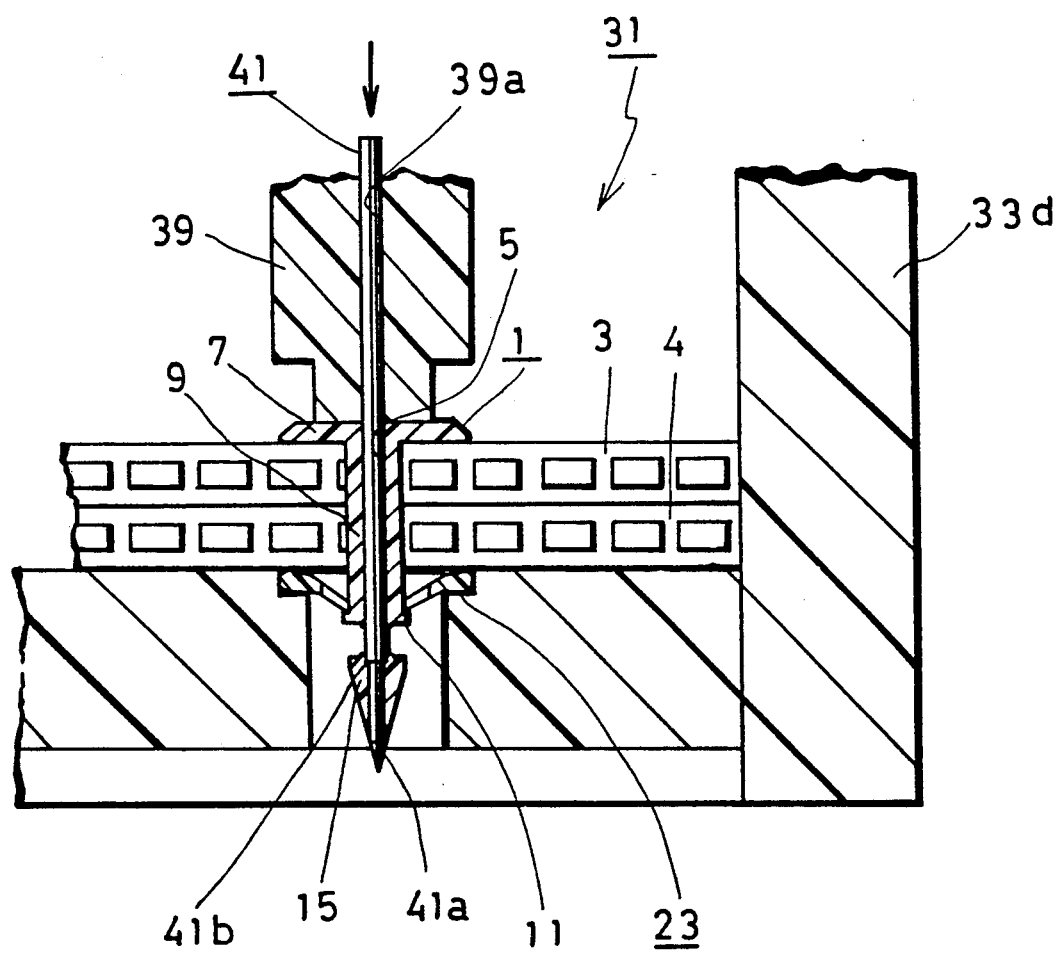
FIG. 7 is a view similar to FIG. 6, but showing he protruding tapered end portion of the joining pin cut off from its shank.

Attention is now directed to FIGS. 5 to 7 showing an apparatus for carrying out the method embodying this invention to join the superimposed corrugated resin sheets 3 and 4 together with the pin 1 and the washer 23.

The apparatus 31 includes a substantially L-shaped main frame 33 having a horizontal portion 33a and a vertical portion 33d, as shown in FIG. 5. The horizontal portion 33a has a hole consisting of a large-diameter portion 33b having a diameter which is equal to the outer diameter of the washer 23, and a small-diameter portion 33c connected coaxially with the large-diameter portion 33b and having a diameter which is larger than the outer diameter of the protruding tapered end portion 15 of the pin 1. A slider 35 is vertically movably supported on the vertical portion 33d of the main frame 33, and a cylinder 37 is connected to the slider 35 for moving it vertically.

The apparatus 31 also includes a pusher shaft 39 disposed vertically and coaxially with the holes 33b and 33c of the horizontal portion 33a of the main frame 33. The pusher shaft 39 has an axial bore 39a, and has an outside diameter which is substantially equal to that of the head 7 of the pin 1. The pusher shaft 39 is supported by the slider 35 vertically movably therewith.

A metal pin 41 is vertically fitted in the axial bore 39a of the pusher shaft 39, and is connected to a cylinder 43 which is supported on the slider 35 coaxially with the pusher shaft 39 for moving the metal pin 41 axially along the axial bore 39a. The metal pin 41 is normally so positioned as to have a portion projecting downwardly from the lower end of the pusher shaft 39 and having a length which is equal to that of the joining pin 1. The metal pin 41 has a pointed lower end 41a having an outer peripheral surface tapered at the same angle as the tapered end portion 15 of the joining pin 1. The metal pin 41 has between its pointed end 41a and the pusher shaft 39 a downwardly facing shoulder 41b which divides the metal pin 41 into an upper portion having a diameter which is equal to that of the axial bore 5 of the joining pin 1, and a lower portion having a diameter which is equal to that of the axial bore 19 of the joining pin 1. The shoulder 41b is provided for resting on the shoulder 21 in the joining pin 1.

Referring now to the method, the washer 23 is fitted in the large-diameter portion 33b of the hole in the horizontal portion 33a of the main frame 33, and the two superimposed corrugated resin sheets 3 and 4 to be joined together are placed on the horizontal portion 33a. The joining pin 1 is fitted about the metal pin 41 projecting downwardly from the pusher shaft 39. The pointed end 41a stays within the tapered end portion 15 of the joining pin 1.

The cylinder 37 is actuated to move down the slider 35 and thereby the pusher shaft 39, so that the pusher shaft 39 may have its lower end abut on the head 7 of the joining pin 1 and push down the joining pin 1 toward the resin sheets 3 and 4. As a consequence, the joining pin 1 abuts on the assembly of the resin sheets 3 and 4, and the pointed end 41a of the metal pin 41 projects from the lower end of the joining pin 1 and is driven into the resin sheet assembly to make a hole therein. As the pusher shaft 39 is further moved down, the tapered end portion 15 of the joining pin 1 protrudes into the hole and enlarges it so that the shank 9 thereof may enter the hole.

As the shank 9 is driven through the hole, the tapered end portion 15 protrudes into the hole 27 of the washer 23 and eventually allows the shoulder 11 on the shank 9 to move past the engaging portions 25a of the washer 23 by deforming them elastically when the shank 9 has been driven through the resin sheets 3 and 4 completely with its head 7 resting on the top of the resin sheet assembly, as shown in FIG. 6. The engaging portions 25a of the washer 23 restore their original positions elastically immediately upon movement of the shoulder 11 past the hole 27 and thereby hole the joining pin 1 against detachment from the washer 23, whereupon the two resin sheets 3 and 4 are secured together by the shank 9 and the washer 23.

Then, the cylinder 43 is actuated to move down the metal pin 41 axially of the joining pin 1, so that its shoulder 41b resting on the shoulder 21 in the joining pin 1 may force down the tapered end portion 15, thereof, whereupon the links 17 are cut off between the shank 9 and the tapered end portion 15, and the tapered end portion 15, is thereby severed from the shank 9. The tapered end portion 15 drops off the metal pin 41 by its own weight.

The cylinder 37 is actuated to retract its piston to remove the metal pin 41 from the shank 9 of the joining pin 1, while the cylinder 43 is also actuated to retract its piston to bring back the metal pin 41 to its original position, whereupon the work of joining the resin sheets 3 and 4 together is completed.

What is claimed is:

1. A method of joining together at least two flat thin objects made of a given material, said method comprising:

positioning and supporting a washer, also made of said given material, beneath a superimposed assembly of said flat, thin objects;

fitting a hollow joining pin, also made of said given material, about a metal pin supported substantially perpendicularly to and coaxially with said washer and positioned above said superimposed assembly of said objects, said joining pin having a head, a shank and a tapered end portion which is severable from said shank, said metal pin having a pointed end about which said tapered end portion of said joining pin is positioned;

moving together said metal pin and said joining pin toward said washer to drive said pointed end of said metal pin and said tapered end portion of said joining pin into said assembly of said flat thin objects to make a hole therein and to force said shank of said joining pin through said hole in said flat thin objects until said shank is fittingly engaged with said washer, whereby said assembly of said flat thin objects are secured together between said head and said washer;

severing said tapered end portion of said joining pin from said shank of said joining pin by moving said metal pin relative to said joining pin such that an engaging portion of said metal pin engages an engageable portion of said severable tapered end portion of said joining pin to cause severing of said tapered end portion from said shank; and removing said metal pin from said joining pin after said shank of said joining pin is fittingly engaged with said washer and after severing of said tapered end portion from said shank.

2. A method as set forth in claim 1, wherein said flat thin objects are sheets of a synthetic resin.

3. A method as set forth in claim 1, wherein:

said shank of said joining pin has a radially outwardly projecting shoulder at an end portion thereof which is remote from said head, said shoulder being engageable with said washer;

said tapered end portion of said joining pin has an inside diameter which is smaller than that of said shank so as to form a shoulder which comprises said engageable portion of said severable tapered end portion;

said engaging portion of said metal pin comprises a shoulder which rests on said shoulder of said severable tapered end portion when said joining pin is fitted about said metal pin; and said step of severing comprises moving said metal pin relative to said joining pin such that said shoulder of said metal pin engages said shoulder of said severable tapered end portion.

4. A method as set forth in claim 2, wherein:

said shank of said joining pin has a radially outwardly projecting shoulder at an end portion thereof which is remote from said head, said shoulder being engageable with said washer;

said tapered end portion of said joining pin has an inside diameter which is smaller than that of said shank so as to form a shoulder which comprises said engageable portion of said severable tapered end portion;

said engaging portion of said metal pin comprises a shoulder which rests on said shoulder of said severable tapered end portion when said joining pin is fitted about said metal pin; and said step of severing comprises moving said metal pin relative to said joining pin such that said shoulder of said metal pin engages said shoulder of said severable tapered end portion.

5. A method as set forth in claim 3, wherein said tapered end portion of said joining pin is connected to said shank of said joining pin by a plurality of members which are breakable by a force applied to said tapered end portion when said metal pin is moved relative to said joining pin through said joining pin.

6. A method as set forth in claim 4, wherein said tapered end portion of said joining pin is connected to said shank of said joining pin by a plurality of members which are breakable by a force applied to said tapered end portion when said metal pin is moved relative to said joining pin through said joining pin.

7. A method as set forth in claim 5, wherein said washer has a slotted portion, and comprising engaging said shoulder of said shank with said slotted portion.

8. A method as set forth in claim 6, wherein said washer has a slotted portion, and comprising engaging said shoulder of said shank with said slotted portion.

* * * * *